(12) United States Patent
Jain et al.

(10) Patent No.: US 10,289,748 B2
(45) Date of Patent: May 14, 2019

(54) OPTIMIZING TRANSMISSION OF DIGITAL COMPONENTS

(71) Applicant: Google Inc., Mountain View, CA (US)

(72) Inventors: Ankur Jain, Redwood City, CA (US); Qian Zhong, San Jose, CA (US); Mohammad Mahdian, Santa Clara, CA (US); Omkar Muralidharan, Sunnyvale, CA (US); Christopher Davis Monkman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 344 days.

(21) Appl. No.: 15/293,846

(22) Filed: Oct. 14, 2016

(65) Prior Publication Data

US 2018/0109612 A1    Apr. 19, 2018

(51) Int. Cl.
*G06F 17/30* (2006.01)
*H04L 29/08* (2006.01)

(52) U.S. Cl.
CPC .... *G06F 17/30902* (2013.01); *H04L 67/2823* (2013.01)

(58) Field of Classification Search
CPC .............. G06F 17/30902; H04L 67/2823
USPC .............................................. 709/217
See application file for complete search history.

(56) References Cited

U.S. PATENT DOCUMENTS

| 7,415,423 | B2* | 8/2008 | Ranka ............. G06Q 10/06315 |
| | | | 705/14.41 |
| 8,346,607 | B1 | 1/2013 | Benson et al. |
| 8,433,297 | B2 | 4/2013 | Ramer |
| 9,619,829 | B2* | 4/2017 | Amacker .......... G06F 17/30554 |
| 2008/0270364 | A1* | 10/2008 | Bayardo ........... G06F 17/30864 |
| 2010/0198694 | A1* | 8/2010 | Muthukrishnan ...... G06Q 30/02 |
| | | | 705/14.71 |
| 2011/0196746 | A1 | 8/2011 | Tang et al. |
| 2011/0239246 | A1 | 9/2011 | Woodward et al. |

(Continued)

FOREIGN PATENT DOCUMENTS

EP    2565838    3/2013

OTHER PUBLICATIONS

'Google' [online]. "Setting bid adjustments," Retrieved on May 13, 2014. Retrieved from the internet: URL<https://support.google.com/adwords/answer/2732132>, 3 pages.

(Continued)

*Primary Examiner* — Joseph E Avellino
*Assistant Examiner* — Patrick F Ngankam
(74) *Attorney, Agent, or Firm* — Fish & Richardson P.C.

(57) ABSTRACT

Methods, systems, and apparatus, including computer programs encoded on a computer storage medium, for optimizing transmission of digital components. In one aspect a digital component distribution system performs operations including determining a minimum eligibility value required to maintain the eligibility of a given digital component based on a next highest eligibility value of one of the other digital components. Based on the next highest eligibility value, a baseline transmission value required to be submitted for distribution of the given digital component is determined. A normalized transmission value is determined based on the minimum eligibility value, and transmission of the given digital component to a client device presenting a particular electronic document is triggered based on the normalized transmission value.

20 Claims, 3 Drawing Sheets

(56) References Cited

U.S. PATENT DOCUMENTS

2013/0055309 A1 2/2013 Dittus
2013/0151334 A1 6/2013 Berkhin et al.
2013/0191235 A1 7/2013 Montero-Mask et al.
2014/0304087 A1 10/2014 Himrod et al.

OTHER PUBLICATIONS

Obasanjo, "Upcoming Changes to Bid Adjustments in the Yahoo! Bing Network," Bing Ads [online], Jun. 5, 2013 [retrieved May 13, 2014]. Retrieved from the internet: URL<http://advertise.bingads.microsoft.com/en-us/blogpost/127361/bing-ads-blog/upcoming-changes-to-bid-adjustments-in-the-yahoo-bing-network>, 3 pages.

* cited by examiner

OPTIMIZING TRANSMISSION OF DIGITAL COMPONENTS

BACKGROUND

This specification relates to data processing and optimization of techniques associated with transmission of electronic documents.

The Internet facilitates the exchange of information and transactions between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A different portion of content (e.g., digital component) can be provided by a third-party (e.g., an entity that is not a publisher of the electronic document and/or does not have access to modify code defining the electronic document). In some situations, the digital component is selected for integration with the electronic document after presentation of the electronic document has already been requested. For example, machine executable instructions included in the electronic document can be executed by a client device when the electronic document is rendered at the client device, and the instructions can enable the client device to contact one or more remote servers to obtain a digital component that will be integrated into the electronic document at the client device.

SUMMARY

In general, one innovative aspect of the subject matter described in this specification can be embodied in methods including the operations of determining, by one or more servers, that a given digital component from a first source is eligible to be presented with a particular document from a second different source, including determining that a component request specifies a given criterion that contributes to triggering transmission of the given digital component; determining, for the given digital component by one or more servers, a baseline eligibility value used to evaluate eligibility of the given digital component relative to the eligibility of other digital components; identifying, for the given digital component, a scaling factor that scales the baseline eligibility value when the given criterion is specified in the component request; determining, by one or more servers, a minimum eligibility value required to maintain the eligibility of the given digital component based on a next highest eligibility value of one of the other digital components; determining, based on the next highest eligibility value by one or more servers, a baseline transmission value required to be submitted by the first source for presentation of the given digital component with the particular document when the minimum eligibility value is less than or equal to the baseline eligibility value; determining, by one or more servers, a normalized transmission value based on the minimum eligibility value required to maintain the eligibility of the given digital component, wherein the normalized transmission value is increased relative to the baseline transmission value based on the minimum eligibility value exceeding the baseline eligibility value; and triggering, by one or more servers, transmission of the given digital component to a client device presenting the particular document based on the normalized transmission value. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Determining a normalized transmission value can include determining how much of the scaling factor is required to be applied to the baseline eligibility value to achieve a scaled eligibility value that meets the minimum eligibility value; determining a normalization factor based on how much of the scaling factor is required to achieve the scaled eligibility value that meets the minimum eligibility value; and adjusting the baseline transmission value based on the normalization factor.

Determining how much of the scaling factor is required to be applied to the baseline eligibility value to achieve a scaled eligibility value that meets the minimum eligibility value can include determining a magnitude by which the baseline eligibility value must be scaled to equal the minimum eligibility value, wherein the determined magnitude specifies how much of the scaling factor is required.

Determining the normalized transmission value can include scaling the baseline transmission value by the determined normalization factor.

Scaling the baseline transmission value by the determined normalization factor can include determining a product of the determined normalization factor and a ratio of the minimum eligibility value relative to a predicted distribution outcome of the given digital component.

Methods can include the operations of determining that the baseline eligibility value meets or exceeds the minimum eligibility value; and setting a normalization factor to one based on the determination that the baseline eligibility value meets or exceeds the minimum eligibility value. Determining the normalized transmission value can include determining a product of the normalization factor and the baseline transmission value.

Determining the baseline transmission value can include determining a ratio of the minimum eligibility value relative to a predicted distribution outcome of the given digital component.

Methods can include the operation of determining a normalized eligibility value for the given digital component, which can include determining the normalized scaling factor based on an exponential function of the scaling factor and a normalization intensity factor that controls how much normalization is applied to the scaling factor; and determining a product of the normalized scaling factor and the baseline eligibility value; and determining that the given digital component is in a set of highest ranked digital components based on a comparison of the normalized eligibility factor to other eligibility factors for other digital components. The set of highest ranked digital components can include those digital components that will be presented with the particular document.

Particular embodiments of the subject matter described in this specification can be implemented so as to realize one or more of the following advantages. The eligibility process performed by a digital component distribution system is enhanced (e.g., optimized) by removing the ability for a digital component provider to "game" the system to decrease the transmission value (e.g., price or other amount) required to be submitted for presentation of a digital component with a particular electronic document (and/or a particular position of the particular electronic document), whereas other distribution techniques left open this possibility of "gaming" the system. The techniques described herein also limit the ability for the digital content provider to "cherry pick" certain types of distribution opportunities by normalizing the effect of a scaling factor that is applied to the baseline distribution value (e.g., bid) for these certain types of distribution opportunities. For example, as described in more detail below, the amount by which the effect of the scaling factor is normalized (e.g., reduced) can be based on the magnitude of the scaling factor (or a function, such as an exponential function, of the magnitude of the scaling factor), thereby increasingly reducing the effect of the scaling factor as it increases. As such, by implementing the techniques described below the system is less susceptible to attempts to unfairly bias the outcome of the digital component evaluation in favor of certain digital component providers. Accordingly, the operation of the system itself is improved by providing a more consistent and fair evaluation of digital components.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, apparatus, and computer readable media that facilitate optimization of techniques associated with transmission of digital components. As discussed in more detail below, the techniques are optimized, for example, by taking into account how much of a scaling factor is required to be used for the digital component to be eligible for transmission to a client device. In some situations, the scaling factor is used to maintain the transmission eligibility of a given digital component by increasing a baseline eligibility value of the given digital component (e.g., when other digital components have eligibility values that are higher than the baseline eligibility value). For example, the baseline eligibility value can be increased so that the adjusted (or scaled) eligibility value of the given digital component remains (or becomes) the highest eligibility value among other eligibility values of other digital components that are available to be transmitted. When the scaling factor is required to be used to maintain the transmission eligibility of the given digital component, the transmission value required to be submitted by a source of the given digital component can be increased (e.g., relative to a baseline transmission value corresponding to the baseline eligibility value). However, as discussed in detail below, the increase to the baseline transmission value can be limited based on how much of the scaling factor was actually required to be used (e.g., instead of a maximum value of the scaling factor). This optimizes (i.e., improves) techniques associated with transmission of digital components by ensuring that digital component sources are only assessed an increased transmission value to the extent that the scaling factor is required to be used to ensure transmission of the digital components. As used throughout this document, the term optimized (or optimal) does not necessarily refer to a most optimal outcome, but rather is used to refer to an improvement provided by implementing the techniques discussed below.

Figure 1:
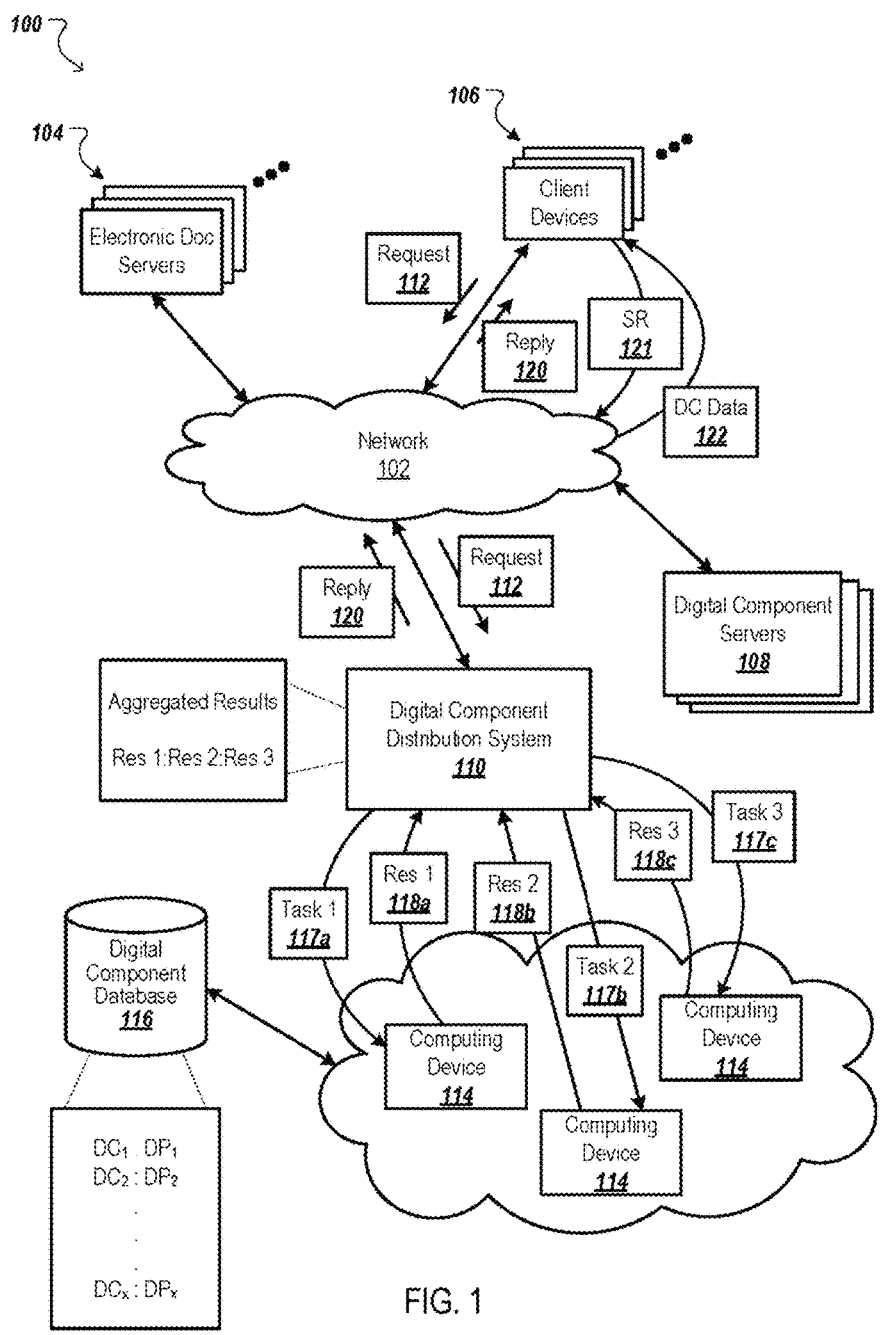
FIG. 1 is a block diagram of an example environment in which content is distributed.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, user devices 106, digital component servers 108, and a digital component distribution system 110 (also referred to as a component distribution system). The example environment 100 may include many different electronic document servers 104, user devices 106, and digital component servers 108.

A client device 106 is an electronic device that is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components (e.g., video files, audio files, images, text, and combinations thereof, which can all take the form of advertising content or non-advertising content) that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the digital component distribution system 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., bid, ranking score, or some other specified value) that is used for evaluating the eligibility of the digital component for distribution/transmission (e.g., among other available digital components), as discussed in more detail below.

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the request 112. For example, the digital component distribution system 110 can select a set of winning digital components (one or more digital components) based on the outcome of one or more content evaluation processes, as discussed below. In turn, the digital component distribution system 110 can generate and transmit, over the network 102, reply data 120 (e.g., digital data representing a reply) that enable the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital component from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

The digital component distribution system 110 can utilize various techniques to evaluate the eligibility of various different digital components that are available to be transmitted in response to a given component request (e.g., an individual component request). For example, the digital component distribution system 110 can compare eligibility values of the various different digital components and select one or more of the digital components having the highest eligibility values as the digital components that will be transmitted to the client device 106 in response to the given component request. In some situations, an initial eligibility value (e.g., bid or other value) of each digital component can be specified by a provider (or source) of the digital component. For example, one provider (P1) of a video clip (VC1) can provide an initial eligibility value of 1.0, and a different provider (P2) of a different video clip (VC2) can provide an initial eligibility value of 1.1. For purposes of this example, assume that the component request is only requesting one digital component to be presented with a particular web page. To select which of the two video clips will be provided, the digital component distribution system 110 can rank VC1 and VC2 based on their respective initial eligibility values and select the highest ranked video clip to be transmitted to the client device in response to the component request. In this example, VC2 would be ranked higher than VC1 because the initial eligibility value of 1.1 for VC2 is higher than the initial eligibility value of 1.0 for VC1.

In some situations, the eligibility of the various different digital components can be evaluated using only the initial eligibility values submitted by the providers (sources) of the digital components. In other situations, the initial eligibility values submitted by the providers are augmented (or varied) based on one or more other factors. For example, the digital component distribution system 110 can generate an adjusted eligibility value for a digital component based on the initial eligibility value of that digital component and a quality factor for the digital component.

The quality factor for a given digital component can quantify the likelihood that the given digital component is an appropriate digital component to be provided in response to a given component request. In some implementations, the quality factor is determined based on one or more features specified by the event data. More specifically, the digital component distribution system 110 can input one or more features from the event data (e.g., geographic information and/or terms from the electronic document) into a machine learning system that outputs a predicted distribution outcome, which can be used as the quality factor. The predicted distribution outcome can be expressed, for example, as a predicted interaction rate (e.g., click-through-rate, play-through-rate, or another measure of interaction with a digital component) for the digital component in the context of the present component request.

Once the quality factor has been obtained, it can be applied to the initial eligibility value to arrive at an adjusted eligibility value. For example, the adjusted eligibility value (AEV) can be a product of the initial eligibility value and the quality factor (e.g., AEV=quality factor*initial eligibility value). In some situations, the adjusted eligibility values of the various different digital components can be used to rank the digital components (e.g., from highest to lowest), and one or more of the highest ranking digital components can be selecting to be transmitted in response to the component request.

The phrase "baseline eligibility value" will be used for the discussions that follow, and the baseline eligibility value can be either of the initial eligibility value or the adjusted eligibility value discussed above.

In some situations, a provider (source) of a given digital component may specify a scaling factor that scales the baseline eligibility value for the given digital component when certain conditions exist. For example, the provider P1 of the video clip VC1 may specify a scaling factor of 1.2 that can be applied when a component request includes a given phrase (e.g., one or more specified words). When a received component request includes the given phrase, the digital component distribution system will apply the scaling factor to the baseline eligibility value to produce a scaled eligibility value for the digital component. Assuming that the baseline eligibility value (either one of the initial or adjusted eligibility values) for VC1 is 1.0, the scaled eligibility value of the given digital component can be 1.2 (e.g., 1.0*1.2). If there is no scaling factor applied to the baseline eligibility value of VC2 (e.g., 1.1), then application of the scaling factor to the baseline eligibility value of VC1 causes VC1 to now be ranked higher than VC2, thereby resulting in VC1 rather than VC2 being identified as the winning digital component, and being transmitted to the client device 106.

The digital component distribution system 110 determines a transmission value (e.g., price or amount) that is required to be submitted (e.g., paid or presented) by a provider (source) of a winning digital component. As described in more detail below, the digital component distribution system can determine the transmission value based on a ratio of the eligibility value of a next highest ranked digital component relative to the predicted distribution outcome of the winning digital component. However, existing techniques for determining the transmission value generally do not adjust the transmission value based on an amount of (or portion of) the scaling factor that is required for the winning digital component to be ranked higher than the next highest ranked digital component. That is, with reference to the example above, existing techniques generally do not consider the fact that VC1 would have been the winning digital component even if the scaling factor had been lower (e.g., set to 1.10), which leads to sub-optimal results. Techniques described below take into account the amount (or portion) of the scaling factor that is actually required for a given digital component to be selected as the winning digital component, thereby enabling more accurate assessments for distribution of digital components (e.g., requiring payment based on the portion of the scaling factor required to be used).

Figure 2:
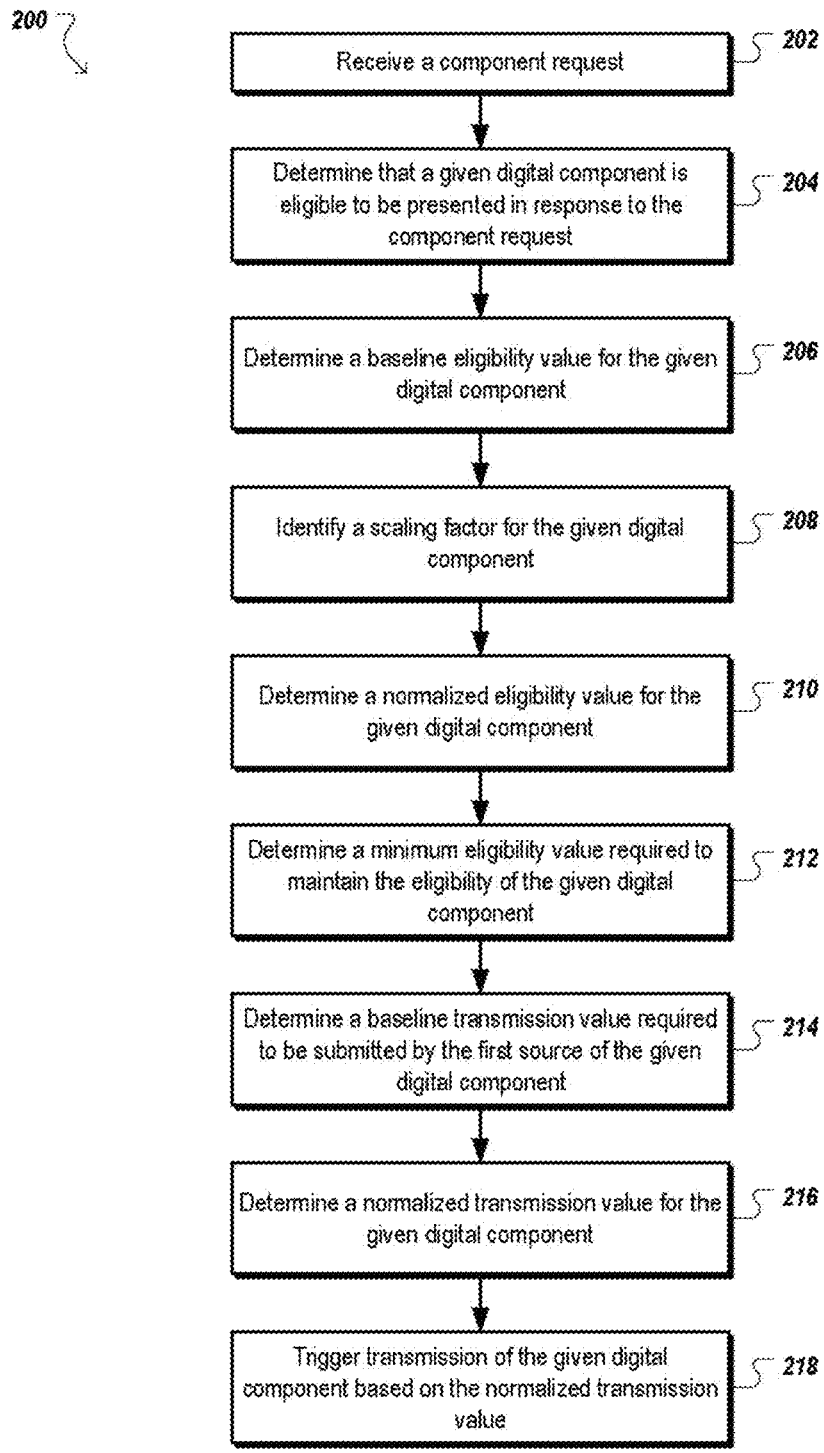
FIG. 2 is a flow chart of an example process for optimizing techniques for transmission of digital components.

FIG. 2 is a flow chart of an example process 200 for optimizing techniques for transmission of digital components. As discussed in more detail below, the optimization reduces the likelihood that a transmission value assigned to distribution of a given digital component will overemphasize the use of a scaling factor, for example, when the scaling factor is higher than required for the digital component to be transmitted or otherwise distributed to a client device. As such, systems that utilize the optimized techniques below will generate a transmission value that more accurately reflects how much of the scaling factor was required (e.g., for a given digital component to be a winning digital component). The process 200 can be used in various situations in which one type of error (e.g., an overestimate or an underestimate) has a more detrimental effect on operation of a system than the other type of error (e.g., an underestimate or an overestimate).

Operations of the process 200 can be implemented by one or more servers (or other computing devices), such as the digital component distribution system 110 of FIG. 1. Operations of the process 200 can also be implemented as instructions stored on a non-transitory computer readable medium, where execution of the instructions by one or more servers (or other computing devices) cause the one or more servers to perform operations of the process 200.

A digital component request is received by one or more servers (202). In some implementations, the digital component request is a request to receive one or more digital components that will be integrated into a presentation of an electronic document at a client device. The digital component request can include event data, such as that discussed above with reference to FIG. 1. The event data can include, for example, various features that provide contextual information about the request. The features of the request can take the form of a multi-dimensional feature vector V, in which the value of each dimension represents an attribute of the request. For example, one dimension of the feature vector V can represent a keyword that is specified in the request, while other dimensions of the vector V can represent attributes such as a time of day when the request was submitted, a day of the week when the request was submitted, a geographic region from which the request was submitted, a category of content specified in the request, information about a user that will be presented with digital component provided in response to the request, as well as various other attributes.

A determination is made that a given digital component from a first source is eligible to be presented with a particular document from a second different source (204). The determination can be made in response to receiving the component request and determining that the component request specifies a given criterion that contributes to triggering transmission of the given digital component. For example, as discussed above with reference to FIG. 1, event data included in the digital component request can be compared to distribution parameters that trigger distribution of the given digital component. When there is a match between the event data and the digital parameters, the given digital component can be deemed eligible for presentation with the particular document.

A baseline eligibility value is determined for the given digital component (206). In some implementations, the baseline eligibility value is a value used to evaluate the eligibility of the given digital component relative to the eligibility of other digital components. As discussed above, the baseline eligibility value can be an initial eligibility value submitted by the first source or an adjusted eligibility value. The adjusted eligibility value can be, for example, a product of the initial eligibility value and a quality factor (e.g., an estimated click-through-rate) for the given digital component. The quality factor can be determined in the context of the received digital content request. For example, features specified in the event data can be input to a predictive mode that provides an estimated interaction rate for the given digital component based on the features specified in the event data.

The model can be generated based on features of prior digital component requests and data specifying whether interactions with the given digital component when presented in response to the prior digital component requests. The model can be generated, for example, by a machine learning system, which can output a model that predicts an interaction rate for requests based on the features of the request. As noted above, the features of the request can take the form of a multi-dimensional feature vector V, in which the value of each dimension represents an attribute of the request. For example, one dimension of the feature vector V can represent a keyword that is specified in the request, while other dimensions of the vector V can represent attributes such as a time of day when the request was submitted, a day of the week when the request was submitted, a geographic region from which the request was submitted, a category of digital components specified in the request, information about a user that will be presented with digital components provided in response to the request, as well as various other attributes. The model can be trained, for example, using machine learning techniques, such as linear regression, that are applied to the features of the requests and the outcomes corresponding to those requests (e.g., whether the digital component was interacted with by the user).

A scaling factor is identified for the given digital component (208). The scaling factor is a number that is used to scale the baseline eligibility value when the given criterion is specified in the component request, as discussed in detail above with reference to FIG. 1. The scaling factor can be identified, for example, by accessing a data store that stores information provided by a provider (or source) of the given digital component, and identifying a given number that is indexed according to or otherwise stored with information identifying the given number as the scaling factor to be used when the given criterion is specified in a component request.

A different scaling factor can be specified for each of multiple different criterion. For example, one scaling factor (e.g., 1.2) may be specified for component requests that include information specifying that a user that will receive the digital component has an interest in fishing, while another scaling factor (e.g., 1.5) can be specified for component requests that include a particular cookie identifier (e.g., corresponding to a client device that performed a particular action at a website, such as requesting information about an item or downloading a specified file). In this example, when a request specifying that the user has an interest in fishing is received, a data store can be accessed to identify the scaling factor of 1.2, which is stored as the scaling factor for component requests that indicate the user as having an interest in fishing. Meanwhile, when a component request specifying the particular cookie identifier is received, the data store can be accessed to identify the scaling factor of 1.5, which is stored as the scaling factor for component requests that include the particular cookie identifier.

A normalized eligibility value is determined for the given digital component (210). In some implementations the normalized eligibility value is determined based on a product of the baseline eligibility value and a normalized scaling factor. The normalized scaling factor can be determined, for example, as a ratio of the scaling factor and a scaling factor normalizer (e.g., NSF=m/SFN, where NSF is the normalized scaling factor, m is the scaling factor, and SFN is the scaling factor normalizer). In turn, the normalized eligibility value can be determined as follows, NEV=BEV*m/SFN, where NEV is the normalized eligibility factor, BEV is the baseline eligibility factor, m is the scaling factor specified by the provider of the digital component, and SFN is the scaling factor normalizer.

In some implementations, the scaling factor normalizer can be determined using an exponential function of the scaling factor and a normalization intensity factor that controls how much normalization is applied to the scaling factor. The normalization intensity factor can be specified by an administrator of the system implementing the techniques discussed in this document, and as such can be pre-specified and obtained from a data store. In other words, the normalization intensity factor need not be determined by the system implementing the techniques discussed in this document.

The normalized scaling factor can be calculated for example, as follows, NSF=m^y, where NSF is the normalized scaling factor, m is the scaling factor, y is the normalization intensity factor. In some implementations, the normalized scaling factor is set to be less than 1.0 (e.g., when the scaling factor is greater than 1.0), such that the normalized scaling factor will be less than the scaling factor, but will result in a normalized eligibility value that is less than the product of the baseline eligibility value and the scaling factor. For example, assume that the baseline eligibility value is 1.0, and the scaling factor is 1.3, and the scaling factor normalized is 0.8. In this example, the normalized eligibility value will be 1.234 (e.g., (1.0*1.3)/(1.3^0.8), which is (BEV*m)/(m^SFN), whereas the product of the eligibility value and the scaling factor would be 1.3 (e.g., 1.0*1.3). As such, normalizing the scaling factor reduces the effect of applying the scaling factor to the baseline eligibility value. If the scaling factor is 1.0 or less, the normalized scaling factor can similarly be set to 1.0 or less.

The normalized eligibility value can be used to determine whether the given digital component will be included in a set of digital components that will be presented with a particular document. For example, assume that three digital components will be presented with the particular document. In this example, the normalized eligibility value can be compared to other eligibility values of other digital components, and the various digital components can be ranked based on the comparison (e.g., from highest to lowest eligibility values). In this example, if the normalized eligibility factor for the given digital component is one of the three highest eligibility scores based on the comparison, the given digital component will be included in the set of highest ranked digital components that will be presented with the particular document. Otherwise, the digital component will not be included in the set of highest ranked digital components. The discussion that follows refers to various eligibility values (e.g., scaled eligibility values and next highest eligibility values), and any of these eligibility values can be normalized in a manner similar to that discussed above.

A minimum eligibility value required to maintain the eligibility of the given digital component is determined (212). In some implementations, the minimum eligibility value is determined based on a next highest eligibility value of one of the other digital components. For example, minimum eligibility value required to maintain the eligibility of the digital given component can be set equal to the next highest eligibility value. For instance, assume that the next highest eligibility value of another digital component is 1.1. In this example, the minimum eligibility value required for the given digital component to maintain its eligibility can be set to 1.1, such that the given digital component must have an eligibility value of 1.1 to prevent the other digital component from displacing the given digital component.

The next highest eligibility value can be determined, for example, using relationship (1):

$$L(DC\_j) = \text{IEV}\_j * QF\_j * m\_j \qquad (1)$$

where, $L(DC\_j)$ is the eligibility value of digital component j, which is the digital component having the next highest eligibility value relative to the scaled (or normalized) eligibility value of the given digital component (e.g., digital component i);

$\text{IEV}\_j$ is the initial eligibility value (e.g., bid) of digital component j;

$QF\_j$ is the quality factor (e.g., predicted click-through-rate) of digital component j; and $m\_j$ is the scaling factor of digital component j.

In some situations, a comparison of the baseline eligibility value of the given digital component to the minimum eligibility value reveals that the baseline eligibility value meets or exceeds the minimum eligibility value. In these situations, the scaling factor is not required to be used to maintain the eligibility of the given digital component, and a baseline transmission value is applied to transmission of the digital component, as described below.

In other situations, the comparison of the baseline eligibility value to the minimum eligibility value reveals that the baseline eligibility value is less than the minimum eligibility value. In these situations, the scaling factor is required to be used in order to maintain the eligibility of the given digital component (e.g., for presentation in a specific location of a page). For example, assume that the baseline eligibility value for the given digital component is 1.0, and that the identified scaling factor is 1.2. Further assume that the minimum eligibility value is 1.1. In this example, the comparison of the baseline eligibility value to the minimum eligibility value reveals that the scaling factor is required to be applied to the baseline eligibility value in order to meet the minimum eligibility value. More specifically, the product of the scaling factor and the baseline eligibility value results in a scaled eligibility value of 1.2, which is higher than the minimum eligibility value of 1.1. When the scaling factor is required to be used to meet the minimum eligibility value, a normalization procedure is used to determine a normalized transmission value that is applied to transmission of the digital component, as described in more detail below.

A baseline transmission value required to be submitted by the first source of the given digital component is determined (214). In some implementations, the baseline transmission value is a value required to be submitted by a source of the given digital component (e.g., a first source) for presentation of the particular document when the minimum eligibility value is less than or equal to the baseline eligibility value of the given digital component. For example, the baseline transmission value can be used when the baseline eligibility value exceeds the next highest eligibility value.

The baseline transmission value can be determined by computing a ratio of the minimum eligibility value relative to a predicted distribution outcome of the given digital component. For example, the baseline transmission value can be determined using relationship (2):

$$BTV\_i = L(DC\_j)/PDO\_i \qquad (2)$$

where, $BTV\_i$ is the baseline transmission value for digital component i (e.g., the given digital component);

$L(DC\_j)$ is the eligibility value of digital component j, as determined in relationship (1) above (i.e., the minimum eligibility value); and $PDO\_i$ is the predicted distribution outcome of digital component i.

In some implementations, the predicted distribution outcome of digital component i (e.g., the given digital component) can be set equal to a predicted interaction rate or click-through-rate for digital component i. For example, a model can be used to predict the click-through-rate for the given digital component in the context of the current component request, and that click-through-rate can be used in relationship (2). In some situations, the predicted interaction rate or click-through-rate is specified by the quality factor for digital component i.

A normalized transmission value for the given digital component is determined (216). In some implementations, the normalized transmission value is determined based on the minimum eligibility value required to maintain the eligibility of the given digital component, and how much of the scaling factor of the given digital component is required for the given digital component to have an eligibility value that meets the minimum eligibility value. For example, when it is determined that the baseline eligibility value for the given digital component meets or exceeds the minimum eligibility value, the scaling factor is not required to be used, such that the normalized transmission value can be set equal to the baseline transmission value. In these situations, a normalization factor (discussed in more detail below) can be set to 1.0 based on the determination that the baseline eligibility value meets or exceeds the minimum eligibility value. As such, the product of the normalization factor and the baseline transmission value will equal the baseline transmission value.

When the baseline eligibility value is less than the minimum eligibility value, the normalized transmission value is going to be higher than the baseline eligibility value based on the determination that the minimum eligibility value exceeds the baseline eligibility value. In some implementations, the amount by which the normalized transmission value exceeds the baseline transmission value depends on how much of the scaling factor is required to be used for the eligibility value of the given digital component to equal the minimum eligibility value. The amount of the scaling factor that is required to be used can be determined, for example, by determining a magnitude by which the baseline eligibility value must be scaled to equal the minimum eligibility value. For example, assume that the minimum eligibility value is 1.1, the baseline eligibility value of the given digital component is 1.0, and the scaling factor for the given digital component is 1.2. In this example, the minimum scaling factor that would enable the eligibility value of the given digital component to equal the minimum eligibility value is 1.1 (i.e., 1.1 (minimum eligibility value)/1.0 (baseline eligibility value)=1.1 (minimum scaling factor required)). In this example, the minimum scaling factor required is the magnitude by which the baseline eligibility value must be scaled to equal the minimum eligibility value, and this minimum scaling factor can be used, as discussed in more detail below, to calculate a normalization factor, which is used to determine how much the baseline transmission value should be adjusted.

As mentioned above, the normalization factor can be determined based on how much of the scaling factor is required to be used. Generally, the magnitude of the normalization factor will increase as the amount of the scaling factor required to be used increases, such that the normalized transmission value will also generally increase as the amount of the scaling factor required to be used increases. Continuing with the example above, only 50% of the available scaling factor (i.e., the amount over 1.0) is required to be used to achieve the minimum eligibility value. As such, in the example above, the normalized transmission value in this example will be less than the normalized transmission value would be if the entire scaling factor (e.g., 1.2) were required to be used, as discussed in more detail below. More formally, the determination of the normalization factor can include determining a magnitude by which the baseline eligibility value must be scaled to equal the minimum eligibility factor. In some implementations, the normalization factor can be determined using relationship (3):

$$NF\_i = 1.0 \text{ for } m \leq 1.0;\ NF\_i = \min(m^x, \text{cap}) \text{ for } m > 1.0 \qquad (3)$$

where, $NF\_i$ is the normalization factor for digital component i;

m is the minimum scaling factor required, as discussed above;

x is a normalization intensity factor; and cap is a maximum normalization factor that can be applied to a baseline eligibility value.

In some implementations, x and cap are selected by an administrator of the system implementing the techniques discussed in this document. The values of x and cap can be selected, for example, to reduce the likelihood of wide variations in the normalization factor (and consequentially normalized transmission values). For example, the normalization factor determined using relationship (3) will be 1.0 when x is set to 0, thereby turning normalization off, and will increase as x is increased, thereby increasing the normalization factor. The cap can be used to ensure that the normalization factor does not exceed some pre-specified magnitude, thereby limiting the effect of the normalization factor and the normalized transmission value.

Once the normalization factor has been determined, it can be applied to the baseline transmission value to determine the normalized transmission value. In some implementations, the application of the normalization factor to the baseline transmission value includes determining a product of the baseline transmission value and the normalization factor. For example, the normalized transmission value can be determined using relationship (4):

$$NTV\_i = NF\_i * BTV\_i \quad (4)$$

where,

NTV_i is the normalized transmission value for digital component i;

NF_i is the normalization factor determined above with reference to relationship (3); and BTV_i is the baseline transmission value determined above with reference to relationship (2).

An alternative relationship for determining the normalized transmission value is provided in relationship (5):

$$NTV\_i = NF\_I * L(DC\_j)/PDO\_i \quad (5)$$

where,

NTV_i is the normalized transmission value for digital component i;

NF_i is the normalization factor determined above with reference to relationship (3);

L(DC_j) is the eligibility value of digital component j, as determined in relationship (1) above (i.e., the minimum eligibility value); and PDO_i is the predicted distribution outcome of digital component i.

In this alternative relationship, it is clear that the normalized transmission value (i.e., the scaled baseline transmission value) can be determined as a product of the determined normalization factor for a given digital component (NF_i) and a ratio of the minimum eligibility value (L(DC_j) and the predicted distribution outcome of the given digital component (PDO_i).

Transmission of the given digital component is triggered based on the normalized transmission value (218). In some implementations, triggering transmission of the given digital component includes transmitting, to a client device that is presenting the particular document, instructions that include a URL from which the given digital component can be obtained by the client device. For example, the instructions can cause the client device to initiate a network request to obtain the given digital component from another server at which the digital component is hosted. When the client device receives data of the given digital component, the client device can render the given digital component and generate a visualization of the given component. The client device can integrate the generated visualization of the given digital component into the particular electronic document that is presented at the client device. In turn, the source of the given digital component can be assessed the normalized transmission value for distribution of the given digital component. For example, a provider of the given digital component can be required to pay the normalized transmission value for distribution of the given digital component.

Figure 3:
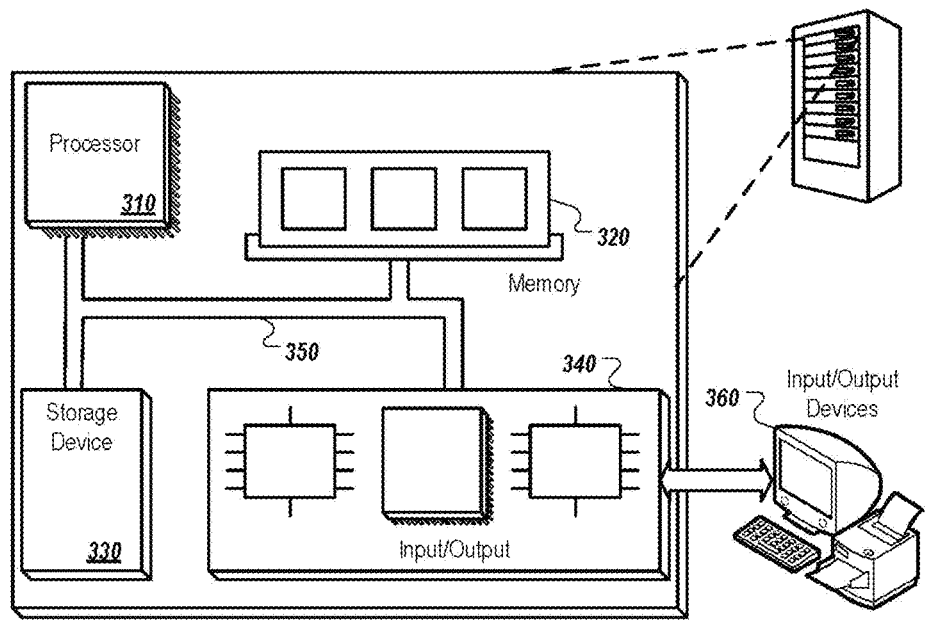
FIG. 3 is a block diagram of an example computing device.

FIG. 3 is block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a digital component database that stores distribution parameters that trigger transmission of a given digital component from a first source;
    a digital component server that transmits the given digital component to client devices;
    a digital component distribution system, including one or more servers, that is in communication with the digital component database and the digital component server, and performs operations including:
        determining that the given digital component is eligible to be presented with a particular document from a second different source, including determining that a component request specifies a given criterion that contributes to triggering transmission of the given digital component;
        determining, for the given digital component, a baseline eligibility value used to evaluate eligibility of the given digital component relative to the eligibility of other digital components;
        identifying, for the given digital component, a scaling factor that scales the baseline eligibility value when the given criterion is specified in the component request;
        determining a minimum eligibility value required to maintain the eligibility of the given digital component based on a next highest eligibility value of one of the other digital components;
        determining, based on the next highest eligibility value, a baseline transmission value required to be submitted by the first source for presentation of the given digital component with the particular document when the minimum eligibility value is less than or equal to the baseline eligibility value;
        determining a normalized transmission value based on the minimum eligibility value required to maintain the eligibility of the given digital component, wherein the normalized transmission value is increased relative to the baseline transmission value based on the minimum eligibility value exceeding the baseline eligibility value; and
        triggering transmission, by the digital component server, of the given digital component to the client device presenting the particular document based on the normalized transmission value.

2. The system of claim 1, wherein determining a normalized transmission value comprises:
    determining how much of the scaling factor is required to be applied to the baseline eligibility value to achieve a scaled eligibility value that meets the minimum eligibility value;
    determining a normalization factor based on how much of the scaling factor is required to achieve the scaled eligibility value that meets the minimum eligibility value; and
    adjusting the baseline transmission value based on the normalization factor.

3. The system of claim 2, wherein determining how much of the scaling factor is required to be applied to the baseline eligibility value to achieve a scaled eligibility value that meets the minimum eligibility value comprises determining a magnitude by which the baseline eligibility value must be scaled to equal the minimum eligibility value, wherein the determined magnitude specifies how much of the scaling factor is required.

4. The system of claim 2, wherein determining the normalized transmission value comprises scaling the baseline transmission value by the determined normalization factor.

5. The system of claim 4, wherein scaling the baseline transmission value by the determined normalization factor comprises determining a product of the determined normalization factor and a ratio of the minimum eligibility value relative to a predicted distribution outcome of the given digital component.

6. The system of claim 1, wherein the digital component distribution system performs operations further comprising:
    determining that the baseline eligibility value meets or exceeds the minimum eligibility value; and
    setting a normalization factor to one based on the determination that the baseline eligibility value meets or exceeds the minimum eligibility value, wherein determining the normalized transmission value comprises determining a product of the normalization factor and the baseline transmission value.

7. The system of claim 1, wherein determining the baseline transmission value comprises determining a ratio of the minimum eligibility value relative to a predicted distribution outcome of the given digital component.

8. The system of claim 1, wherein the digital component distribution system performs operations further comprising:
    determining a normalized eligibility value for the given digital component including:
        determining the normalized scaling factor based on an exponential function of the scaling factor and a normalization intensity factor that controls how much normalization is applied to the scaling factor; and
        determining a product of the normalized scaling factor and the baseline eligibility value; and
    determining that the given digital component is in a set of highest ranked digital components based on a comparison of the normalized eligibility factor to other eligibility factors for other digital components, wherein the set of highest ranked digital components include those digital components that will be presented with the particular document.

9. A method, comprising:
- determining, by one or more servers, that a given digital component from a first source is eligible to be presented with a particular document from a second different source, including determining that a component request specifies a given criterion that contributes to triggering transmission of the given digital component;
- determining, for the given digital component by one or more servers, a baseline eligibility value used to evaluate eligibility of the given digital component relative to the eligibility of other digital components;
- identifying, for the given digital component, a scaling factor that scales the baseline eligibility value when the given criterion is specified in the component request;
- determining, by one or more servers, a minimum eligibility value required to maintain the eligibility of the given digital component based on a next highest eligibility value of one of the other digital components;
- determining, based on the next highest eligibility value by one or more servers, a baseline transmission value required to be submitted by the first source for presentation of the given digital component with the particular document when the minimum eligibility value is less than or equal to the baseline eligibility value;
- determining, by one or more servers, a normalized transmission value based on the minimum eligibility value required to maintain the eligibility of the given digital component, wherein the normalized transmission value is increased relative to the baseline transmission value based on the minimum eligibility value exceeding the baseline eligibility value; and
- triggering, by one or more servers, transmission of the given digital component to a client device presenting the particular document based on the normalized transmission value.

10. The method of claim 9, wherein determining a normalized transmission value comprises:
- determining how much of the scaling factor is required to be applied to the baseline eligibility value to achieve a scaled eligibility value that meets the minimum eligibility value;
- determining a normalization factor based on how much of the scaling factor is required to achieve the scaled eligibility value that meets the minimum eligibility value; and
- adjusting the baseline transmission value based on the normalization factor.

11. The method of claim 10, wherein determining how much of the scaling factor is required to be applied to the baseline eligibility value to achieve a scaled eligibility value that meets the minimum eligibility value comprises determining a magnitude by which the baseline eligibility value must be scaled to equal the minimum eligibility value, wherein the determined magnitude specifies how much of the scaling factor is required.

12. The method of claim 10, wherein determining the normalized transmission value comprises scaling the baseline transmission value by the determined normalization factor.

13. The method of claim 12, wherein scaling the baseline transmission value by the determined normalization factor comprises determining a product of the determined normalization factor and a ratio of the minimum eligibility value relative to a predicted distribution outcome of the given digital component.

14. The method of claim 9, further comprising:
- determining that the baseline eligibility value meets or exceeds the minimum eligibility value; and
- setting a normalization factor to one based on the determination that the baseline eligibility value meets or exceeds the minimum eligibility value, wherein
  - determining the normalized transmission value comprises determining a product of the normalization factor and the baseline transmission value.

15. The method of claim 9, wherein determining the baseline transmission value comprises determining a ratio of the minimum eligibility value relative to a predicted distribution outcome of the given digital component.

16. The method of claim 9, further comprising:
- determining a normalized eligibility value for the given digital component including:
  - determining the normalized scaling factor based on an exponential function of the scaling factor and a normalization intensity factor that controls how much normalization is applied to the scaling factor; and
  - determining a product of the normalized scaling factor and the baseline eligibility value; and
- determining that the given digital component is in a set of highest ranked digital components based on a comparison of the normalized eligibility factor to other eligibility factors for other digital components, wherein the set of highest ranked digital components include those digital components that will be presented with the particular document.

17. A non-transitory computer readable medium storing instructions that when executed by one or more computing devices, cause the one or more computing devices to perform operations comprising:
- determining that a given digital component from a first source is eligible to be presented with a particular document from a second different source, including determining that a component request specifies a given criterion that contributes to triggering transmission of the given digital component;
- determining, for the given digital component, a baseline eligibility value used to evaluate eligibility of the given digital component relative to the eligibility of other digital components;
- identifying, for the given digital component, a scaling factor that scales the baseline eligibility value when the given criterion is specified in the component request;
- determining a minimum eligibility value required to maintain the eligibility of the given digital component based on a next highest eligibility value of one of the other digital components;
- determining, based on the next highest eligibility value, a baseline transmission value required to be submitted by the first source for presentation of the given digital component with the particular document when the minimum eligibility value is less than or equal to the baseline eligibility value;
- determining a normalized transmission value based on the minimum eligibility value required to maintain the eligibility of the given digital component, wherein the normalized transmission value is increased relative to the baseline transmission value based on the minimum eligibility value exceeding the baseline eligibility value; and
- triggering transmission of the given digital component to a client device presenting the particular document based on the normalized transmission value.

18. The non-transitory computer readable medium of claim 17, wherein determining a normalized transmission value comprises:
- determining how much of the scaling factor is required to be applied to the baseline eligibility value to achieve a scaled eligibility value that meets the minimum eligibility value;
- determining a normalization factor based on how much of the scaling factor is required to achieve the scaled eligibility value that meets the minimum eligibility value; and
- adjusting the baseline transmission value based on the normalization factor.

19. The non-transitory computer readable medium of claim 18, wherein determining how much of the scaling factor is required to be applied to the baseline eligibility value to achieve a scaled eligibility value that meets the minimum eligibility value comprises determining a magnitude by which the baseline eligibility value must be scaled to equal the minimum eligibility value, wherein the determined magnitude specifies how much of the scaling factor is required.

20. The non-transitory computer readable medium of claim 17, further comprising:
- determining a normalized eligibility value for the given digital component including:
  - determining the normalized scaling factor based on an exponential function of the scaling factor and a normalization intensity factor that controls how much normalization is applied to the scaling factor; and
  - determining a product of the normalized scaling factor and the baseline eligibility value; and
- determining that the given digital component is in a set of highest ranked digital components based on a comparison of the normalized eligibility factor to other eligibility factors for other digital components, wherein the set of highest ranked digital components include those digital components that will be presented with the particular document.

* * * * *

UNITED STATES PATENT AND TRADEMARK OFFICE
CERTIFICATE OF CORRECTION

PATENT NO. : 10,289,748 B2
APPLICATION NO. : 15/293846
DATED : May 14, 2019
INVENTOR(S) : Jain et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this
Thirty-first Day of December, 2019

Andrei Iancu
*Director of the United States Patent and Trademark Office*